(12) United States Patent
Igval et al.

(10) Patent No.: US 7,021,528 B2
(45) Date of Patent: Apr. 4, 2006

(54) SYSTEM AND METHOD FOR TRACKING CHECKS

(75) Inventors: Yakup J. Igval, Milford, CT (US); Richard W. Heiden, Huntington, CT (US)

(73) Assignee: Pitney Bowes Inc., Stamford, CT (US)

( * ) Notice: Subject to any disclaimer, the term of this patent is extended or adjusted under 35 U.S.C. 154(b) by 238 days.

(21) Appl. No.: 10/707,375

(22) Filed: Dec. 9, 2003

(65) Prior Publication Data
US 2005/0121517 A1    Jun. 9, 2005

(51) Int. Cl.
G07D 11/00    (2006.01)
G07F 19/00    (2006.01)

(52) U.S. Cl. .................. 235/379; 235/385; 705/39; 705/410

(58) Field of Classification Search ............. 235/384; 705/401, 402, 404, 410, 60, 62
See application file for complete search history.

(56) References Cited

U.S. PATENT DOCUMENTS

| | | | |
|---|---|---|---|
| 4,404,649 A | 9/1983 | Nunley et al. .......... 364/900 |
| 5,237,159 A * | 8/1993 | Stephens et al. ........... 235/379 |
| 6,557,755 B1 * | 5/2003 | Pickering, Jr. et al. ..... 235/376 |
| 6,564,996 B1 * | 5/2003 | Hoffman et al. ........... 235/379 |
| 2002/0046194 A1 * | 4/2002 | Gelfer .................. 705/401 |
| 2002/0120562 A1 | 8/2002 | Opiela et al. ............ 705/39 |
| 2003/0055791 A1 * | 3/2003 | Bodie et al. ............. 705/62 |
| 2003/0183685 A1 | 10/2003 | Steele Moore et al. ..... 235/379 |
| 2004/0031846 A1 * | 2/2004 | Burgess ................. 235/375 |
| 2004/0186802 A1 * | 9/2004 | Castelluzzo ............ 705/35 |
| 2005/0209976 A1 * | 9/2005 | Bailey et al. ........... 705/402 |

FOREIGN PATENT DOCUMENTS

| | | |
|---|---|---|
| EP | 0741376 A2 | 11/1996 |
| WO | 02/15034 A1 | 2/2002 |

* cited by examiner

Primary Examiner—Jared J. Fureman
(74) Attorney, Agent, or Firm—George M. Macdonald; Angelo N. Chaclas; Steven J. Shapiro (57) ABSTRACT

Systems and methods for providing a track and trace capabilities for checks in the mail stream and in the bank check clearing system are described. A mailing machine facilitates the association of a confirmation tracking number with a mail piece and a check. The track and trace system provides for tracking the check through the mail stream and also through the bank check clearing system using the confirmation tracking number.

19 Claims, 5 Drawing Sheets

SYSTEM AND METHOD FOR TRACKING CHECKS

BACKGROUND OF INVENTION

The illustrative embodiments disclosed in the present application are useful in systems including those for tracking and tracing shipments and mailings workflow and more particularly are useful in systems including those for tracking checks through the mail and banking systems.

Certain shipping companies provide detailed track and trace information to shipping customers. Additionally, some mailers track where their mailings are within the postal mailstream using the United States Postal Service (USPS) CONFIRM® system. The CONFIRM system provides some tracking information to mailers on both their outgoing mailings and incoming replies using PLANET (Postal Alpha Numeric Encoding Technique) Code technology. Mailers identify and track their mail by placing a PLANET Code as an additional barcode on the mailing letter or flat. The encoded data is captured when the mailpiece passes through postal mail sorting equipment. This data is then transmitted to the mailer's computer system or to the CONFIRM interactive Web site.

The CONFIRM system provides a Destination Confirm service that tracks outgoing mailpieces such as solicitations, credit cards and statements, so that mailers will know when the mail is about to be delivered. Additionally, the CONFIRM system provides an Origin Confirm service that tracks incoming reply mail such as payments, orders and other responses. The mailer may use the advance notification that a reply is on the way in processing payments and managing cash more efficiently. Additionally, the mailers may evaluate the success of mailing campaigns in near real time.

Certain mailers use mailing machines and postage meters for processing mail. The DM SERIES™ of digital mailing machines, including the DM900™ digital mailing systems, are available from Pitney Bowes, Inc. of Stamford, Conn. and include IntelliLink™ Technology. The DM SERIES™ mailing machine enable customers to use preprinted 22-digit barcode labels having Package Identification Codes (PIC) to remotely, electronically request USPS Confirmation services such as Delivery Confirmation, Signature Confirmation and Certified Mail. The 22-digit PIC codes may then be used to track the mailpiece using the USPS website.

The USPS CONFIRM confirmation systems typically provide data scan sets only at acceptance and delivery. For example, only one scan data set is provided at delivery for outgoing mail and one scan data set at acceptance for incoming return mail. USPS EXPRESS MAIL services may provide more tracking data points to users.

Traditional Track and Trace solutions can help lower payment collection costs by reducing the need to send dunning notices or make unnecessary and potentially relationship damaging collection calls when the payment is already in route in the mail. In the traditional return payment tracking system, the user assumes that the customer has actually placed payment in the envelope that is being sent to the lockbox.

Some financial institutions provide large customers with the ability to track checks that they deposit as the checks proceed through the check clearing system. In that way, those customers may receive advance notice such as a refusal on first presentment of a check at a particular institution.

Such prior art payment mailing tracking systems do not provide the ability to track that a check is in the mail and they do not provide the additional ability to track those checks through the check clearing system.

SUMMARY OF INVENTION

The present application describes systems and methods for providing a track and trace capabilities for checks in the mail stream and in the bank check clearing system. A mailing machine facilitates the association of a confirmation tracking number with a mailpiece. Alternatively, the unique combination of ABA routing number, account number and check number are associated with the confirmation tracking number. The confirmation tracking number is optionally printed on the check. The track and trace systems provides for tracking the check through the mail stream and also through the bank check clearing system using the confirmation tracking number.

In an alternative, a check tracking identifier is assigned to the check and the envelope. The check tracking identifier is associated with the confirmation tracking number and either number may be used to track the check in the mail stream and in the bank check clearing system.

In another alternative, an accounting system with online postage integration is used to associate the confirmation tracking number with the check for tracking through the mail stream and the bank check clearing system.

DETAILED DESCRIPTION

Illustrative embodiments describing systems and methods for the tracking and tracing of check payments are described. The illustrative embodiments are described with reference to checks, but may be applied to other instruments as well. For example, in an alternative embodiment, electronic payment transactions may be assigned tracking numbers and tracked using the systems described herein.

Mailing machines such as the DM800™ mailing machine include a local vault postage meter and a data connection system for remote communication with a central meter Data Center. Similarly, voice communication with the Data Center may be established. The Data Center facilitates functions including POSTAGE-BY-PHONE™ that allows postage meter users to remotely add postage value to their postage meter without bringing the meter to a local post office. The DM800™ may facilitate attached peripherals and in an alternative described herein, a MICR magnetic ink character recognition system is attached.

Mailing systems such as the CLICK STAMP ONLINE (CSO)™ online postage system include a remote vault postage meter in communication with a local processor. The online postage service may be integrated with computer applications such as word processors. Additionally, accounting systems such as QUICKBOOKS and QUICKBOOKS PRO accounting software may be utilized to print checks. Certain embodiments described herein utilize a personal computer based accounting system that prints checks and is integrated with an online postage system to print envelopes with postage indicia. The system is also capable of printing tracking codes such as barcodes on the checks and the envelopes. Such systems may be implemented as modifications to existing accounting packages or may be developed using a development system such as MICROSOFT VISUAL STUDIO with relevant available libraries and source code.

The present application describes systems and methods for providing a track and trace capabilities for checks in the mail stream and in the bank check clearing system. In an illustrative embodiment, a mailing machine and postage meter is used to generate a tracking number that is assigned to a check and the mail piece that is to be used to deliver the check. The mailing machine prints the particular tracking number on the check and on the mail piece. In an alternative, the user inputs the check identifier numbers manually or by scanning the check. Optionally, the mailing machine then communicates the tracking number to the bank and to the postal carrier using a modem or other network connection such as a dedicated connection to the Internet. The check tracking system provides the user the ability to track the delivery status of the check through the mail system and the status of the check clearing activity through the banking system. Optionally, the user is provided the ability to enable notifications to be sent when the check reaches milestones such as delivery and payment or encounters problems such as a payment refusal due to insufficient funds.

An illustrative process utilizes a DM SERIES mailing machine. The user selects the check tracking service and enters the bank ABA routing number, the account number and the check number using the mailing machine keyboard. In an alternative, the check routing and account information may be stored in the meter and only the check number required. If checks will be used in sequence, possibly skipping some checks, a starting check number can be entered and incremented as needed. The DM SERIES mailing machine may includes a MICR or optical scanner for scanning the check information. In one alternative, the mailing machine is used to print a tracking number on the check such as the PIC code or another tracking number.

The user then prepares the mail piece containing the check. The user selects the appropriate postal delivery confirmation service and enters the PIC tracking code. The mailing machine then associates the relevant check tracking numbers with the mail tracking numbers. In one alternative, the same number is used. The mailing machine uploads the check tracking number to the financial system used for tracking the check through the banking check clearing process. The mailing machine uploads the mail tracking number to the postal system such as the USPS CONFIRM server.

In an alternative, an intermediary service coordinates the two tracking functions to present a seamless interface to the user. The mailing machine sends tracking information to the intermediary server. The intermediary then processes requests from the user. A mailing machine manufacturer using a Data Center that is already configured to interface with the mailing machines may provide the intermediary service. The Data Center receives the tracking numbers and uses the ABA number to lookup the required information from a bank database. The database provides information regarding the bank infrastructure and relevant transmission protocols and data formats. The Data Center then sends the appropriate tracking numbers to the banking and postal systems.

The user may then track the checks through the postal and banking systems. The user logs into the Data Center check-tracking server using an authentication protocol. The Data Center then queries the check status of all checks being tracked by that user and displays the postal and banking status and information fields. Alternatively, the tracking number may be used to retrieve check status.

In one alternative, the tracking number identifies a user and the mail stream and financial institutions push the tracking data to a user system. In another alternative, the users are able to pull the tracking data from the institutions or a third party intermediary.

In an illustrative embodiment, a mailing machine facilitates the association of a confirmation tracking number with a mailpiece. Additionally, the unique combination of ABA routing number, account number and check number are associated with the confirmation tracking number. The user may type in the check identifier numbers or a scanner may be used to scan the check identifier. The confirmation tracking number is optionally printed on the check. The track and trace systems provides for tracking the check through the mail stream and also through the bank check clearing system using the postal confirmation tracking number. The confirmation tracking number comprises a PIC code. Alternatively, another tracking number may be used as described herein. The system may be utilized to track outgoing checks mailed for payment.

Additionally, the system facilitates optionally allowing the intended recipient of the check to track the check. For example, the intended recipient may be provided with an individual tracking number. For that reason, the tracking numbers optionally do not reveal sensitive information such as bank routing and account numbers. Furthermore, the system may be utilized to track checks that are received in payment as they are mailed to a bank for collection.

In an alternative, a check tracking identifier is assigned to the check and the envelope. The check tracking identifier is associated with the confirmation tracking number and either number may be used to track the check in the mail stream and in the bank check clearing system.

In another alternative, an accounting system with online postage integration is used to associate the confirmation tracking number with the check for tracking through the mail stream and the bank check clearing system.

Figure 1:
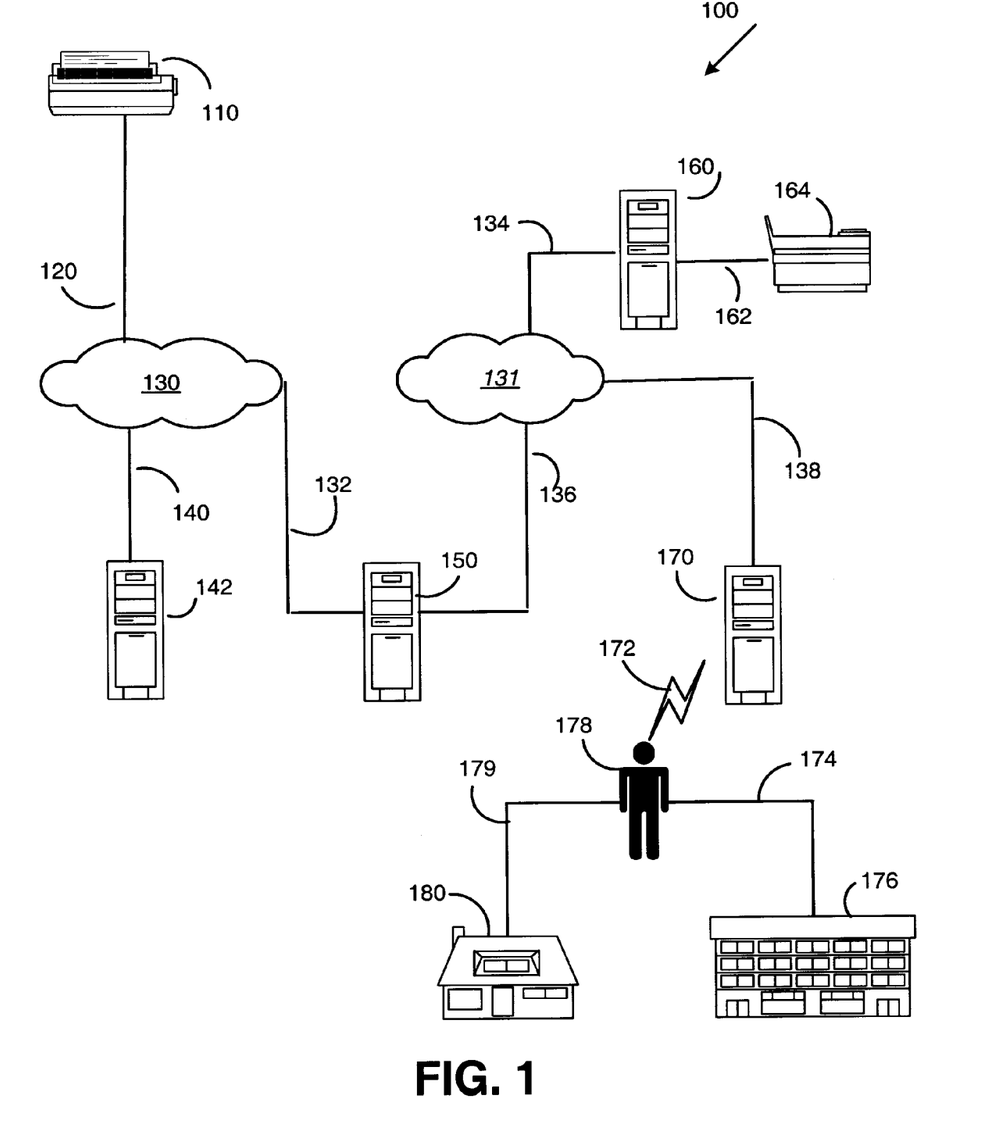
FIG. 1 is a schematic representation of an illustrative check tracking system including a local vault postage meter according to an illustrative embodiment of the present application.

Referring to FIG. 1, an illustrative check tracking system 100 including a local vault postage meter 110 according to an illustrative embodiment of the present application is shown.

Mailing machine 110 is a DM800 mailing machine connected by communications channel 120 to network 130. Communications channel 120 is a POTS telephone connection to a private network 130 that has a modem pool. Alternatively, connections 120 may be accomplished using an Internet connection. A Data Center server 150 is connected to the private network 130 using communications channel 132 and may be directly connected to the mailing machines 110 using a modem pool. The communications channel 132 is a high speed ETHERNET connection. The Data Center services check tracking requests and also services other meter transaction requests such as postage refills. A financial system bank server 142 provides a bank check tracking service and is connected to the private network 130 using ETHERNET connection 140. Alternatively, the Data Center server 150 communicates with the bank server 142 using the Internet.

The Data Center server 150 is connected to the Internet 131 using connection 136. The mail service confirmation server 160 is a CONFIRM server that is connected to the Internet 131 using connection 134. The confirmation server 160 is connected to postal scanning equipment 164 using network connections 162. As mail pieces travel through the postal system, the scanning equipment provides some or all of the scan data to CONFIM server 160. The CONFIRM data is made available to the users 110 directly or indirectly using the Data Center 150.

The Carrier Delivery Confirmation server 170 is connected to the Internet 131 using connection 138. The postal carriers 178 have a data link 172 to the Delivery Confirmation server 170. The communications link 172 may be a wireless real-time link or a delayed upload of data such as when docking a portable data terminal to a network docking station. The carriers take routes 179 and 174 to deliver mail pieces to consumers 180 and businesses 176, respectively. The carrier scans the mail piece upon delivery and may obtain signature confirmation if requested.

In using the system, a typical user will enter a request at mailing machine 110 for check tracking service and postal delivery confirmation. If the system is a remote vault postage meter system, the user also requests postage. In an alternative, a particular check tracking service includes a delivery confirmation service such as Delivery Confirmation. The user then selects or enters check identification information such as the check number.

The mailing machine 110 requests a tracking number from the data center 150. The mailing machine 110 will also receive check-tracking data, which in the early stage of the process is that a tracking request has been initiated. The PIC number is printed on the envelope and optionally on the check. The check number is associated with the PIC number at the Data Center 150.

Alternatively, the PIC tracking numbers are preprinted on labels and provided to the users. The PIC number would then be sent from the mailing machine to the data center. In another alternative, a separate check tracking number is generated and associated with the PIC tracking number and the check number.

In the intermediary configuration, the Data Center 150 aggregated the data. The Data Center 150 receives CONFIRM postal tracking data from the USPS CONFIRM server 160 according to the PIC number or PLANET Code. The Data Center 150 receives delivery confirmation data from the Delivery Confirmation Server 170 as it is received from carriers 178. The Data Center 150 receives check tracking and status information from the bank server 142 as the checks are processed in the check clearing system.

The data center 150 then aggregates the tracking information and provides the user with tracking information. The tracking information may be pushed to the user in an email on an exception basis or at specified points such as delivery only or every scan point. Alternatively, the user may be authenticated at the e-commerce front end of the data center to pull the data sorted for the user. Alternatively, the mailing machine 110 may directly query the data. In another alternative, the tracking numbers may be used to obtain tracking information and the tracking numbers may be provided to third parties such as the intended recipient of the particular check. In order to provide additional security, a pin number may be associated with each check tracking number.

In an alternative, one server provides the CONFIRM functionality and the delivery confirmation functionality. The described system is illustrative and a typical system would include many mailing machines and online postage systems. The communications channels are typically secured such as being in a closed network or encrypted using VPN technology. The servers are SUN servers that are geographically and load balanced with redundancy. The Databases are SAP and ORACLE databases with a secure e-commerce front-end for user transactions. Other equipment configurations may be used.

Figure 2:
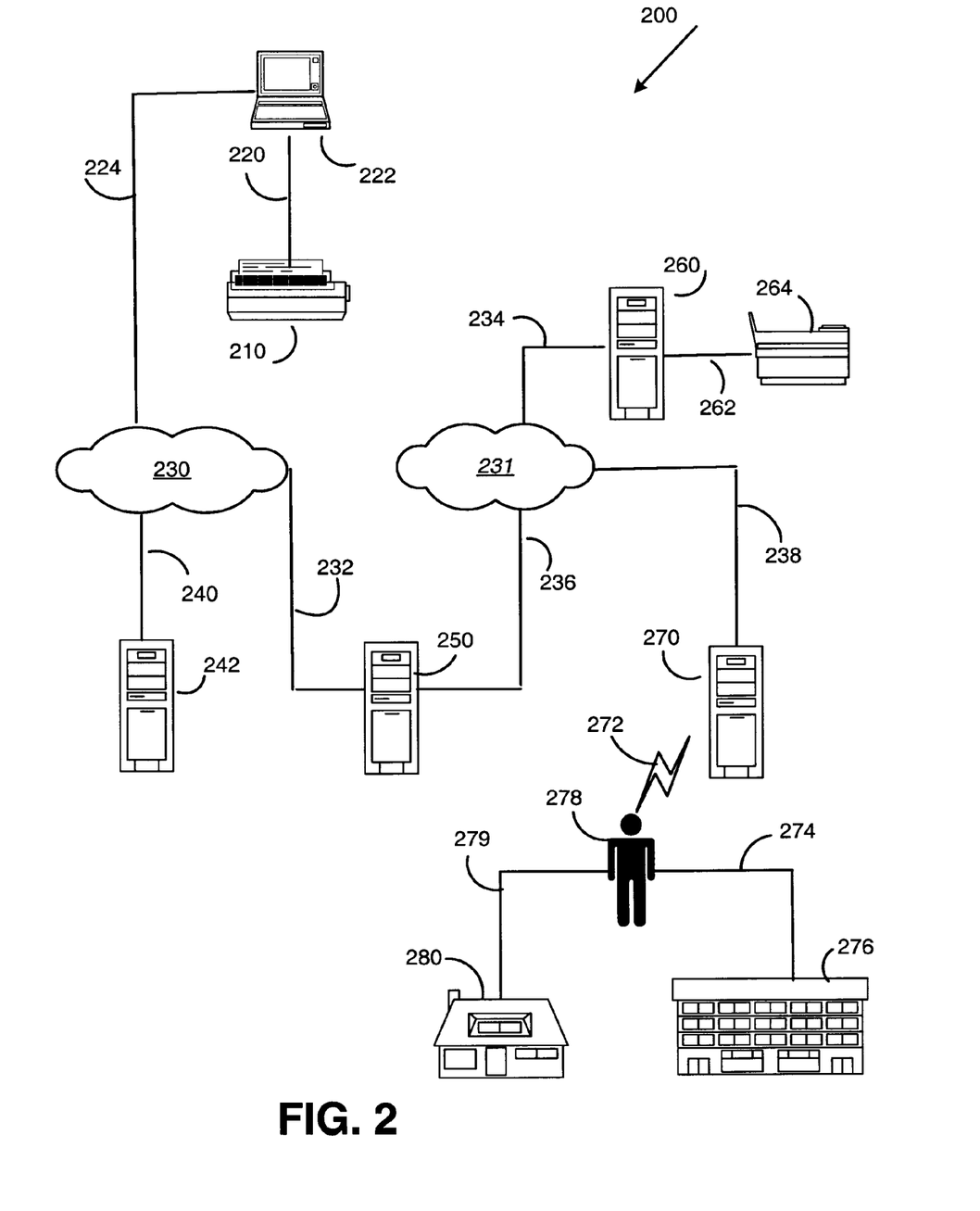
FIG. 2 is a schematic representation of an illustrative check tracking system including a remote vault postage meter and a PC accounting system according to another illustrative embodiment of the present application.

Referring to FIG. 2, an illustrative check tracking system 200 including a remote vault postage meter and a PC accounting system resident on PC 222 according to another illustrative embodiment of the present application is shown.

Processor 222 is connected to printer 210 using communications channel 220. The processor 222 is connected to private LAN 230 using a modem link 224. A Data Center server 250 is connected to the private network 230 using communications channel 232. A financial system bank server 242 provides a bank check tracking service and is connected to the private network 230 using communications channel 240. The Data Center server 250 is connected to the Internet 231 using connection 236. The mail service confirmation server 260 is a CONFIRM server connected to the Internet 231 using connection 234. The confirmation server 260 is connected to postal scanning equipment 264 using network connections 262. The carrier delivery confirmation server 270 is connected to the Internet 231 using connection 238. The postal carriers 278 have a data link 272 to the delivery confirmation server 270. The carriers 278 take routes 279 and 274 to deliver mail pieces to consumers 280 and businesses 276, respectively.

In using the system, a typical user will enter a request at PC 222 for online postage and for a check tracking and postal delivery confirmation service. PC 222 includes a financial system such as QUICKEN with online postage capability. The system is configured to print checks and already has the check routing, account and number information. In this configuration, the check amount may be provided to the Data Center 250 in order to confirm the amount during the check clearing process. A PIC code is requested either from a local store of PIC numbers or from a remote system such as the Data Center 250. The PIC postal tracking number is then associated with the check tracking data. In an alternative, a separate check tracking number is provided and associated with the check and the PIC number.

The check and envelope with PIC code are then printed using printer 210. Alternatively, separate printers may be used.

In this configuration, an intermediary system is not used. PC 222 requests tracking information from the bank and postal service systems and locally aggregates the tracking data.

In another alternative, the tracking numbers may be used to obtain tracking information and the tracking numbers may be provided to third parties such as the intended recipient of the particular check. In order to provide additional security, a pin number may be associated with each check tracking number. Alternatively, other communications channels may be substituted for those described. The configuration described is illustrative. A representative system would include many user terminals and other network topologies and server configurations may be used.

Figure 3:
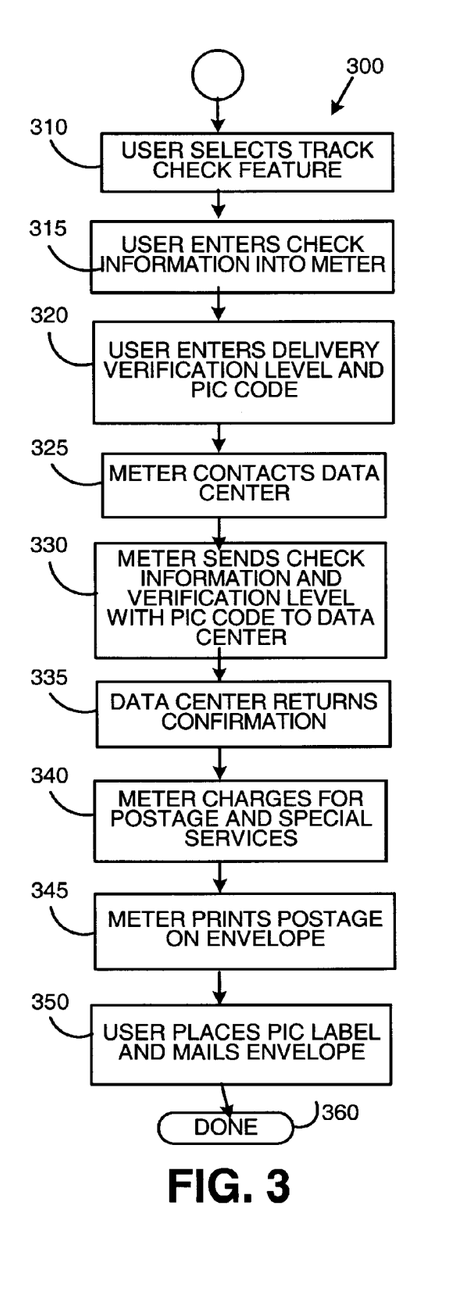
FIG. 3 is a flow chart showing a check tracking process using pre-assigned tracking numbers according to another illustrative embodiment of the present application.

Referring to FIG. 3, a check tracking process 300 using pre-assigned tracking numbers according to another illustrative embodiment of the present application is shown.

In step 310, the user selects the track check feature of a mailing machine. In step 315, the user enters check information into the mailing machine. Some identifying information may already be stored in the mailing machine and the user may only enter the check number. Optionally, the user also enters the check amount so that the amount can be verified during the check clearance process.

In step 320, the user selects a postal tracking service such as delivery confirmation. As described above, the DM800 mailing machine typically allows a user to type in a 22-digit PIC tracking code from a roll of preprinted labels. The code may be input be providing an indication that the previous PIC code be incremented by one. Alternatively, the PIC barcode label may be scanned. In another alternative, the track check feature selection also selects a level of confirmation.

In step 325, the user initiates a communication session between the mailing machine and the data center. Alternatively, the mailing machine stores a number of tracking transactions before contacting the data center to upload the data. In another alternative, the communications session continuously exists across a wide area network such as the Internet.

In step 330, the mailing machine sends postal tracking and check information to the data center including the PIC code and level of confirmation service requested. In step 335, the data center confirms that the tracking transaction was successfully initiated. In step 340, the mailing machine charges for the postage and the special services. Alternatively, the check tracking service is provided without a fee or a fee is collected using a business model other than a per use service fee. For example, the service may be purchased under a monthly subscription, may be sponsored by a third party or may be charged for only when a user receives an exception report such as a pushed email notice that a check was refused at first presentment at a particular bank.

In step 345, the mailing machine franks the envelope. Alternatively, this step may occur earlier in the process after the amount of postage required is determined. In step 350, the user places the PIC label on the envelope, places the check in the envelope and then deposits the mail piece in the mail stream. In step 360, the process ends and the user may restart the process.

Figure 4:
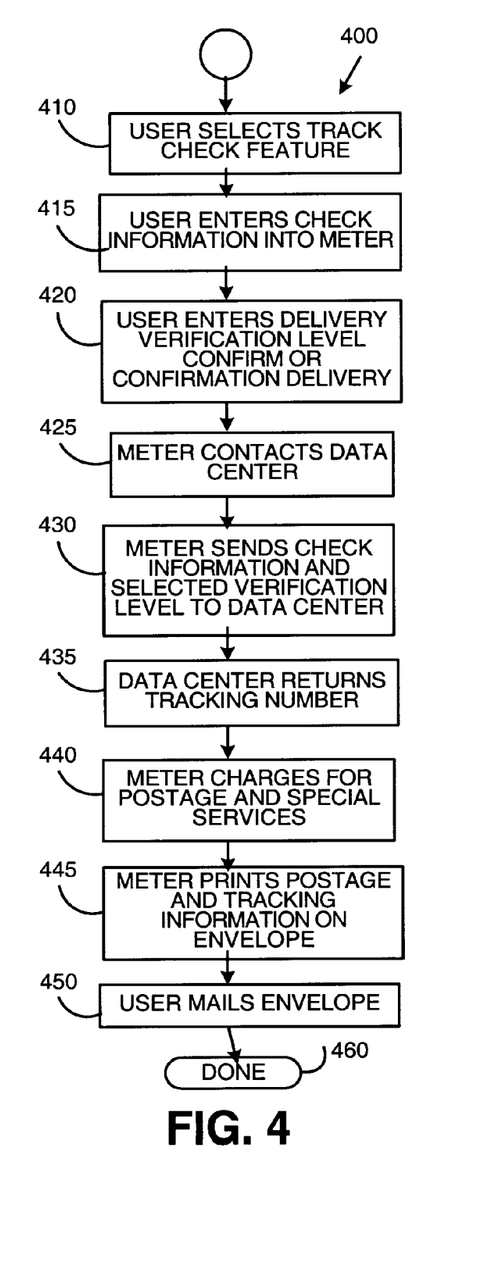
FIG. 4 is a flow chart showing a check tracking process using a local vault postage meter according to another illustrative embodiment of the present application.

Referring to FIG. 4, a check tracking process 400 using a local vault postage meter according to another illustrative embodiment of the present application is shown.

In step 410, the user selects a track check feature of a mailing machine. In step 415, the user enters check information into the mailing machine. In step 420, the user selects a postal tracking service such as delivery confirmation. In this configuration, at least one tracking number is assigned by the Data Center.

In step 425, the mailing machine contacts the data center. In step 430, the mailing machine sends the check information to the data center with the level of confirmation service requested. In step 435, the data center returns at least a postal tracking number to the mailing machine. In an alternative, an additional check tracking number is provided. In step 440, the mailing machine charges for the postage and the special services. In step 445, the mailing machine franks the envelope and prints the PIC tracking number on the envelope. Alternatively, the mailing machine also prints a tracking number on the check. In step 450, the user deposits the mail piece in the mail stream. In step 460, the process ends and the user may restart the process.

Figure 5:
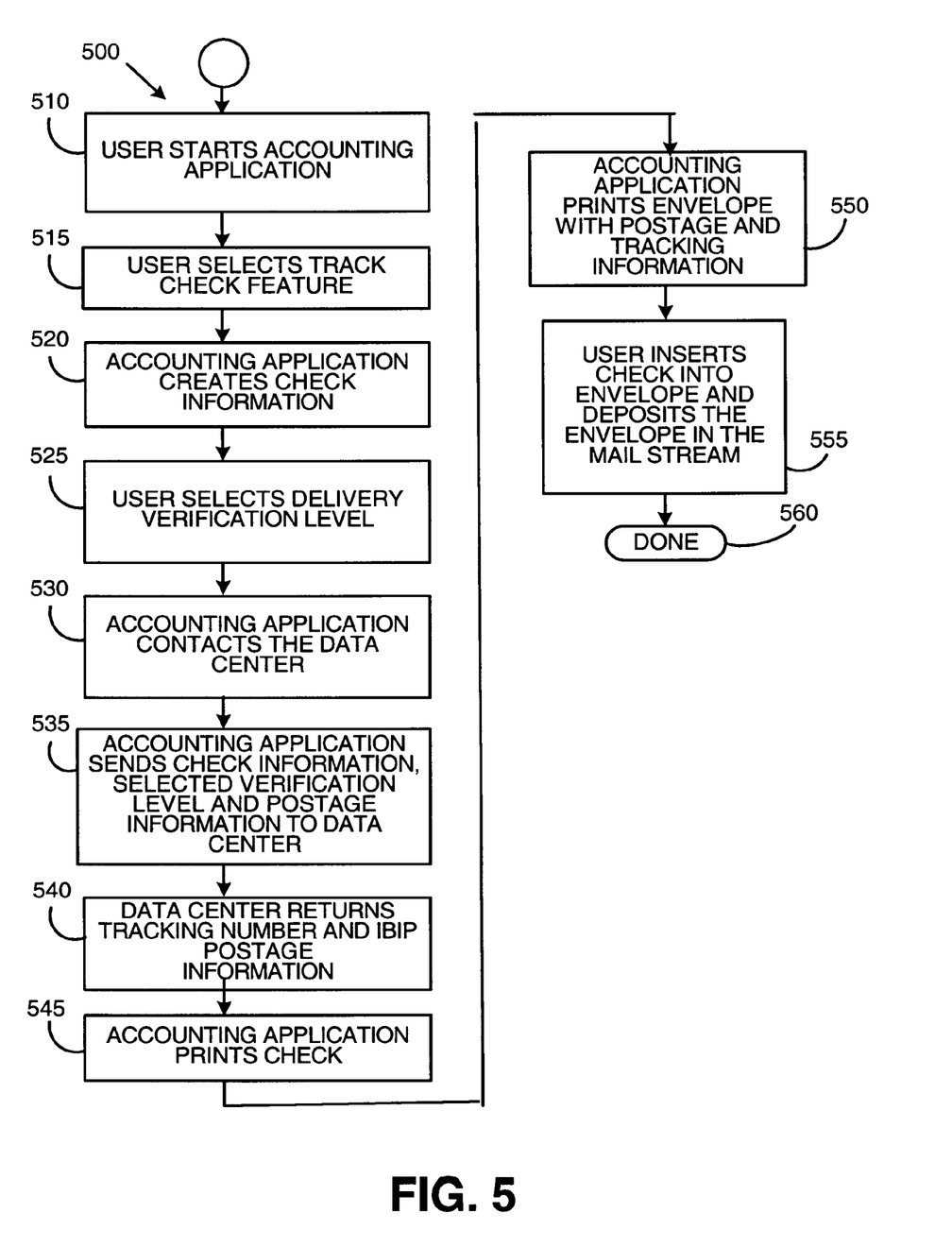
FIG. 5 is a flow chart showing a check tracking process using a remote vault postage meter and a PC accounting system according to another illustrative embodiment of the present application.

Referring to FIG. 5, a check tracking process 500 using a remote vault postage meter and a PC accounting system according to another illustrative embodiment of the present application is shown.

In step 510, the user starts an accounting application that produces checks and is also integrated with an online postage system. In an alternative, the check tracking application executes separately from the accounting package and the online postage package. A typical accounting package that may be used is the QUICKEN® available from Intuit, Inc. of Mountain View, Calif.

In step 515, the user selects the track check service. In step 520, the accounting system creates a check with check tracking information such as a routing number, account number and check number. Alternatively, another check tracking number is obtained. In step 525, the user selects a postal delivery verification level. In an alternative, the level is set when the track check service is selected. In step 530, the accounting system establishes a connection with the data center and requests postage and a postal tracking number. In an alternative having a separate online postage system, the online postage system separately interacts with the data center for the postage request.

In step 535, the accounting system sends the check tracking information and verification level information to the data center. In step 540, the data center returns a postal tracking number such as a PIC code and information for an Information Based Indicia Program (IBIP) postal indicia.

In step 545, the accounting system prints the check. In step 550, the accounting application prints the envelope with an IBIP indicia and a PIC tracking barcode. In an alternative, the accounting program provides the data center with pre-assigned PIC code numbers. In step 555, the user places the check in the envelope and places the envelope mail piece in the mail stream. In step 560, the process ends and the user may start the process again.

In an alternative, the accounting program is integrated with the tracking system and pulls postal and check tracking data from the data center or the postal and financial system servers. In another alternative, the postal and check tracking data is pushed to the accounting program.

Figure 6:
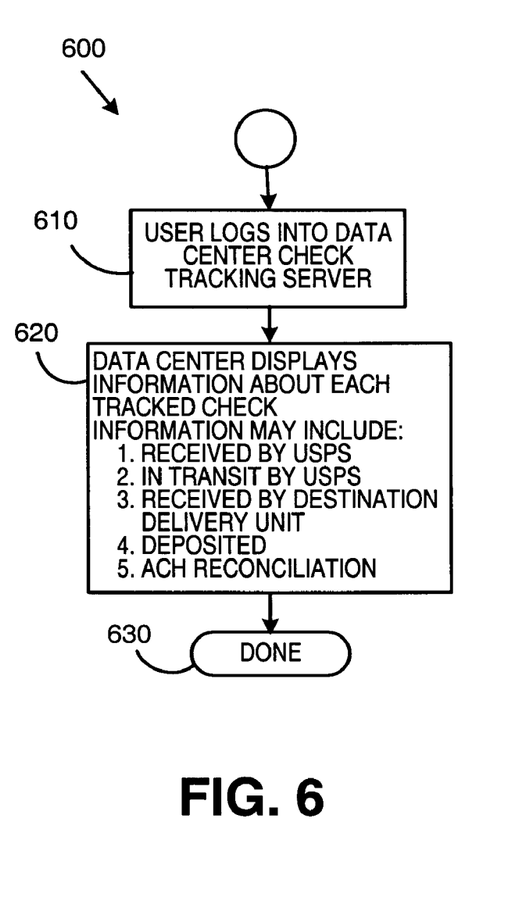
FIG. 6 is a flow chart showing a process for a user receiving check-tracking status according to another illustrative embodiment of the present application.

Referring to FIG. 6, a process 600 for a user receiving check-tracking status according to another illustrative embodiment of the present application is shown.

In step 610, the user logs into data center check tracking server with a username and password. Alternatively, other authentication systems may be used. In step 620, the data center displays information about each tracked check. For example, the displayed information may include whether the USPS received the mail piece being tracked. The information may include other data regarding the mail piece such as whether the mail piece is in transit with the USPS. The data may indicate that the mail piece was received at its intended destination. The data may indicate that the enclosed check was deposited for collection at the destination bank and the data may indicate the check clearance status such as the check being cleared through the ACH system. Other check data may be provided such as failed presentment notices. Furthermore, the user may sort the data. In step 630, the process ends.

Figure 7:
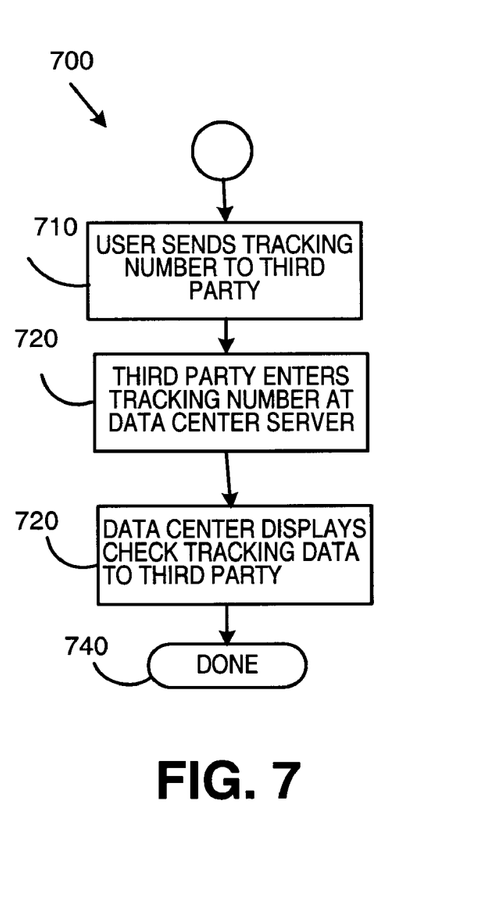
FIG. 7 is a flow chart showing a process for a recipient receiving check-tracking status according to another illustrative embodiment of the present application.

Referring to FIG. 7, a process 700 for a recipient receiving check-tracking status according to another illustrative embodiment of the present application is shown.

In step 710, the user sends a tracking number to a third party. The tracking number may include only the PIC code, the PIC code and check number or another identifier that is associated with the PIC code or the tracking number.

In step 720, the third party enters the tracking number at data center server. In step 730, the data center displays check tracking data to the third party for only the check associated with that tracking number. In step 740, the process ends and the third party may enter another tracking number.

In an alternative, the third party is sent a pin code that must be entered before receiving tracking information from the system.

The PC processing systems used are typically INTEL PENTIUM® based personal computer, but other computers such as MACINTOSH APPLE computers may be used. Similarly, the processing systems may include, but are not limited to, data processors, mobile computers, tablet computers, Personal Digital Assistants (PDA) and cell phones.

The present application describes illustrative embodiments of a system and method for tracking checks. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

The invention claimed is:

1. A method for tracking checks though a mail system and a bank clearing system comprising:
   obtaining a postal tracking identifier associated with a mail piece from a user;
   receiving a check identifier associated with the mail piece;
   receiving postal tracking data associated with the postal tracking identifier;
   receiving check tracking data associated with the check identifier;
   associating the postal tracking data with the check tracking data; and
   sending the postal tracking data and the check tracking data to the user.

2. The method of claim 1, wherein,
the postal tracking identifier is a PIC code.

3. The method of claim 2, wherein,
the postal tracking identifier is received from a user.

4. The method of claim 1, wherein,
the check identifier includes an ABA routing number, an account number and a check number.

5. The method of claim 1, wherein,
the check identifier includes an identifier provided by a check tracking data center.

6. A method for providing check tracking information to a user comprising:
   obtaining a postal tracking identifier associated with a mail piece that includes a check;
   receiving check information identifying the check;
   associating the postal tracking identifier with the check information;
   receiving check processing information associated with second check information;
   receiving mail piece tracking information associated with the postal tracking identifier; and
   associating the mail piece tracking information with the check processing information.

7. The method of claim 6, further comprising,
authenticating the user; and
providing the mail piece tracking information and the check processing information to the user.

8. The method of claim 6, further comprising,
receiving the postal tracking identifier from a third party; and
providing the mail piece tracking information and the check processing information to the third party.

9. The method of claim 6, further comprising,
obtaining a third tracking number associated with the check;
receiving the third tracking number from a third party;
receiving a pin code associated with the third tracking number from the third party; and
providing the mail piece tracking information and the check processing information to the third party.

10. The method of claim 6, wherein,
the check processing information includes an indication of whether the check has been paid.

11. The method of claim 6, wherein,
the check processing information includes a processing history including time stamps and an indication of whether the check has been refused.

12. The method of claim 6, wherein,
the postal tracking identifier is a PIC code.

13. The method of claim 6, wherein,
the postal tracking identifier is received from a user.

14. The method of claim 6, further comprising
requesting the mail piece tracking information from a postal system server.

15. The method of claim 6, further comprising
requesting the check processing information from a bank system server.

16. A method for tracking checks through a mail system and a bank clearing system comprising:
   obtaining a postal tracking identifier associated with a mail piece from a user;
   receiving a check identifier associated with the mail piece;
   receiving postal tracking data associated with the postal tracking identifier;
   receiving check tracking data associated with the check identifier;
   associating the postal tracking data with the check tracking data; and
   sending the postal tracking data and the check tracking data to the user, wherein the postal tracking identifier is generated by a mailing machine.

17. The method of claim 16, further comprising:
transmitting the postal tracking identifier from the mailing machine to a central postal data center.

18. The method of claim 17, further comprising:
printing the postal tracking identifier on the mail piece using the mailing machine.

19. The method of claim 17, wherein,
the postal tracking data and the check tracking data is sent to the user via the mailing machine.

* * * * *